United States Patent Office 3,666,578
Patented May 30, 1972

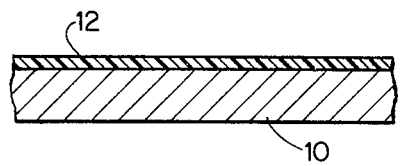
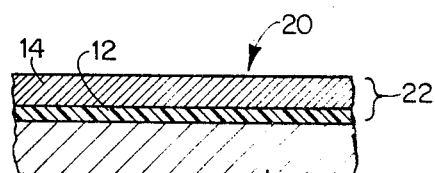
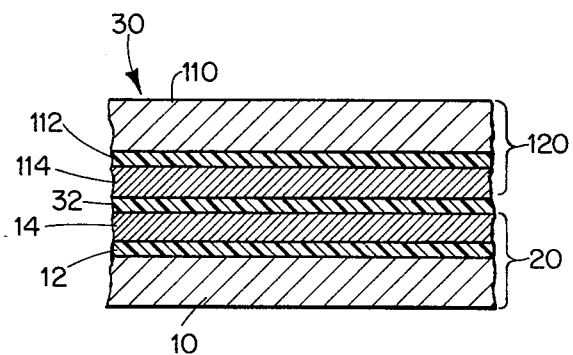
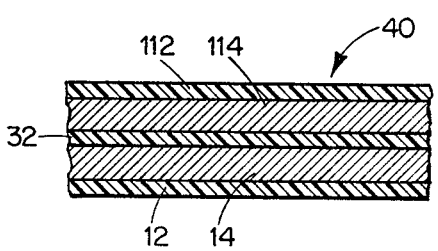
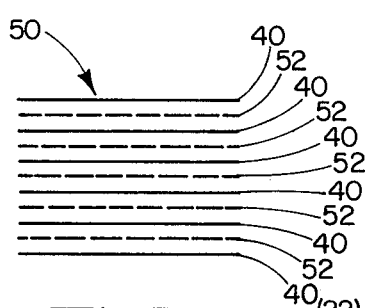

3,666,578
PRODUCTION OF HIGH MODULUS LAMINATES
Earl E. Chadsey, Jr., Sudbury, and Frank Feakes, Lexington, Mass., assignors to National Research Corporation, Cambridge, Mass.
Filed Sept. 29, 1969, Ser. No. 861,943
Int. Cl. B32b 15/08; B44d 1/34; C23c 13/02; C23f 1/00
U.S. Cl. 156—3
7 Claims

ABSTRACT OF THE DISCLOSURE

Laminates of repeating elements of stiff reinforcement are produced by coating the stiff reinforcement onto a very thin resin substrate. The resin substrate is applied in fluid form as a pre-coat to a temporary heavy substrate. The pre-coated substrate is overcoated with the stiff reinforcement to a thickness in excess of resin thickness. Then the temporary substrate is removed and the elements of resin/stiff material are laid up into a laminate. The resultant laminate is characterized by high volume fraction of the stiff material and limited weight of the resin due to its low density and limited volume fraction in the laminate.

---

The present invention relates to the production of high stiffness composites for use as structures and in other applications. The invention relates particularly to laminates with repeating layers of reinforcing sheet of a stiff material such as boron, the reinforcement being present in the laminate in a volume fraction of about 40–60%.

The invention herein described was made in the course of or under a contract or subcontract thereunder (or grant) with the Department of the Army.

BACKGROUND

Prior inventors and/or disclosers have already invented and/or made known (a) The utility of composite materials comprising high stiffness reinforcement materials such as boron filament and boron films.
(b) The utilization of a laminate approach to producing improved composites.
(c) Coating of the stiff material onto a substrate and laminating repeating units of such stiff material.
(d) Etching away substrates from stiff material coatings to increase the volume fraction of stiff material in the final laminate.
(e) Other reinforcement materials.

OBJECTS

The objects of the present invention are to provide improvements in laminated composites and in production thereof affording improvement in one or more of the following aspects (and preferably in all):

(a) high volume fraction of reinforcement,
(b) high planarity in reinforcement layers,
(c) low stresses in reinforcement layers,
(d) protection of reinforcement layers from degradation during laminate production,
(e) ease of handling of reinforcement in laminate production,
(f) economy of materials usage,
(g) simplicity of production steps, and
(h) high specific stiffness of the laminate.

The thickness of the resin layer should be less than a mil (.001 inch). The thickness of the stiff material should be at least equal to that of the resin layer and no greater than three times resin layer thickness, preferably no greater than two times resin layer thickness to facilitate handling of the coated product. Additional adhesive layers added to the laminate should be as thin as practicable—preferably substantially less than resin layer thickness.

Coating of the stiff reinforcement material is carried out with the pre-coated substrate at as high a temperature as permitted by the resin to insure good adhesion and reduce coating cracking stresses.

GENERAL DESCRIPTION

A substrate web is pre-coated on at only one surface with an uncured resin (monomer or other pre-polymer form, including incompletely cross-linked polymers or dissolved polymer) in a fluid form (i.e. flowable state whether liquid or soft solid) and cured to a solid form of low outgassing property (partially or completely cured). Then the substrate is over-coated on its resin coated face with the desired stiff material reinforcement. Elevated temperatures are employed. After coating with the stiff material, the substrate web is removed and the remaining stiff material/resin unit is laminated with other like units to form a laminate product.

The resin pre-coat is cured (e.g. by polymerization or solvent removal), at least in part, during the process, preferably immediately after application. It is also within the general scope of the invention to reserve some of the curing of the resin to the laminating step and to utilize the resin as a laminating adhesive.

The stiff reinforcing material is preferably boron, but may also be selected from other materials having a high modulus of elasticity, particularly in relation to density—boron carbide, carbon, silicon carbide, aluminum oxide, beryllium, aluminum boride, silicon nitride, and refractory metal compounds (Ta, Cb, Mo, W, Hf, Ti, Zr, V, Cr as borides, nitrides, silicides, carbides), all having a Young's modulus above $30 \times 10^6$ p.s.i. The manner of coating the stiff material is preferably by vacuum deposition, but may also be by chemical vapor deposition or other coating processes, involving transport of the coating material to the substrate in vapor, solid or liquid form and heating of the substrate to enhance adhesion and continuity of the deposited coating to at least 200° C. and for some materials to about 400–600° C. These reinforcing materials also have low coefficients of thermal expansion and contraction ($15 \times 10^{-6}$/° C, or less).

The resin is preferably polyimide, but may also comprise other high temperature resins, e.g. phenolics, polyesters, polybenzimidazoles, polybenzothiazoles, poly-paraxylylene, polyamidines, polyimideamide. Its primary function is to serve as a matrix for the stiff reinforcing material in the finished laminate. It is desirable therefore that it have relatively high shear strength. It must also provide protection to the reinforcing material during removal of the temporary substrate material.

The material used for the temporary substrate has the principal criterion that it must be compatible with the coating material to allow formation of a thick planar layer of coating. It may be a foil of material having a good coefficient of expansion match with the coating; titanium is a good choice in this respect for boron reinforcement. It may be a material having a bad coefficient match but of sufficiently great thickness that the mismatch is not troublesome—e.g. 2 mil thick aluminum foil. The latter is preferred for reasons of economy.

Other objects, features and advantages of the invention will in part be obvious from the foregoing description and will in part appear hereinafter.

SPECIFIC DESCRIPTION

The invention is now specifically described with reference to the accompanying drawings wherein FIGS. 1–4 are schematic sectional views of the elements of a laminate at various states of processing and FIG. 5 is a diagram of a typical laminate.

BASIC APPROACH

Referring to FIG. 1 there is shown a temporary substrate 10 of 2.0 mil thickness aluminum foil which is pre-coated with a fluid form uncured resin layer. The layer is cured to a solid lacquer layer 12. The lacquer layer 12 can be self-levelling while in fluid form and would compensate for surface scratches and other roughnesses on the surface of substrate 10.

FIG. 2 shows FIG. 1 product coated with a stiff reinforcing material, e.g. boron, to form a primary coated product 20.

FIG. 3 shows the initial formation of a primary laminate 30. A unit 20 (as in FIG. 2) is placed in face-to-face relation with a similar unit 120 at their boron coated faces with an intervening layer of adhesive 32 which may be an epoxy coat on each boron face and/or a separate film of epoxy. The adhesive bonds the units 20, 120 together. Then the laminate 30 is dipped into an etch bath to remove the substrates 10, 110. The resultant product, shown in FIG. 4, is a finished primary laminate 40 which comprises outer layers 12, 112 of lacquer sandwiching layers 14, 114 of the stiff reinforcing material which are adhered to each other by the adhesive layer 32.

FIG. 5 shows production of the final, secondary laminate 50 which is made by alternating layers 40 of primary laminate and adhesive 52.

VARIATIONS

Some of the basic variations of the above are as follows:

(1) The primary unit of lamination in FIG. 4 can be the resin/reinforcement unit 22 of FIG. 2 which can be obtained by etching the substrate 10 of FIG. 2.

(2) The primary and/or secondary laminate can eliminate adhesive by resort to reinforcement self-bonding (e.g. 14 to 114 in FIG. 4) or by partially curing the lacquer in the FIG. 1 step and completing cure in the FIG. 5 step (whether the primary unit is 40 or 22).

(3) Substrates of some of the units 40 or 22 can be left in to provide a strength safety factor or to expedite handling of the primary and/or secondary laminates while a majority of units have the substrates etched to provide high volume fraction of reinforcement.

The above Basic Approach describes a preferred and distinctly advantageous embodiment of the invention.

The invention also has distinct merit without regard to improved volume fraction of laminate in that the present process provides a way of producing substrate films of the high temperature resin which is more economical compared to conventional processes such as extrusion of the very thin films. In addition, the present process allows the combination of outgassing and resin curing steps which makes it particularly suitable in combination with vacuum coating.

What is claimed is:

1. Method of making a laminate containing layers of high stiffness material reinforcement in high volume fraction comprising the steps of (I) pre-coating a substrate web with a continuous fluid layer of un-cured resin; (II) curing the resin at the web surface to form a solid and continuous layer thereof at the substrate web surface of from .01 to 1.0 mil thickness; the substrate and resin being selected for properties of resistance to degradation at least 200° C. and the substrate being further selected for compatibility at high temperature to ambient thermal cycling with a deposited film thereon of stiff coating having a modulus of elasticity in excess of $30 \times 10^6$ p.s.i. and a coefficient of thermal expansion of less than $15 \times 10^{-6}/°$ C., the resin being further selected for a density of less than 2 gram/cc.; (III) depositing a continuous coating of a stiff reinforcing material on said resin surfaced substrate, the coating being carried out at a substrate temperature of at least 200° C. and followed by cooling of the coated web to ambient temperature, the coating being carried out for sufficiently long time and at sufficient deposition rate to produce a thickness greater than resin thickness; (IV) removing the substrate to leave a coating of the stiff material on the resin base at a volume fraction in excess of 40% and (V) laminating repeating units of the resin/stiff material subassembly to form a laminate with alternating layers of resin/stiff material.

2. The method of claim 1 wherein the coating is selected from the class of materials comprising boron, boron carbide, carbon, silicon carbide, aluminum oxide, beryllium, aluminum boride, silicon nitride, and refractory metal compounds having a modulus of elasticity in excess of $30 \times 10^6$.

3. The method of claim 1 wherein the coating is carried out by evaporation of the coating material in vacuum and condensation of the evaporant on the resin surface of the substrate in the vacuum.

4. The method of claim 1 wherein the resin is selected from the group comprising polyamideimides, polyimides, polybenzimidazoles, polyesters and polythiazoles.

5. The method of claim 1 wherein part of the curing step is carried out subsequent to the beginning of coating with the stiff material.

6. The method of claim 1 wherein the substrate is removed by etching away.

7. The method of claim 1 wherein the substrate of a repeating unit is removed after a laminating step.

References Cited

UNITED STATES PATENTS

| | | | |
|---|---|---|---|
| 3,397,085 | 8/1968 | Cariou et al. | 117—106 X |
| 3,460,976 | 8/1969 | Allen | 117—106 X |
| 2,692,190 | 10/1954 | Pritikin | 156—8 X |
| 3,179,634 | 4/1965 | Edwards | 260—78 |

WILLIAM A. POWELL, Primary Examiner

U.S. Cl. X.R.

117—71, 75, 107; 156—151, 246, 249; 161—214